United States Patent
Anan et al.

[11] Patent Number: 5,965,676
[45] Date of Patent: Oct. 12, 1999

[54] PRODUCTION PROCESS, PRODUCTION APPARATUS, AND PRODUCT OF RESIN PARTICLE

[75] Inventors: Kazuhiro Anan; Ritsuo Kitada, both of Takatsuki; Mitsuo Kushino, Kawabe-gun, all of Japan

[73] Assignee: Nippon Shokubai Co., Ltd., Osaka, Japan

[21] Appl. No.: 08/963,392

[22] Filed: Nov. 3, 1997

[30] Foreign Application Priority Data

Nov. 14, 1996 [JP] Japan ................................ 8-303210

[51] Int. Cl.$^6$ ........................................................ C08F 2/00
[52] U.S. Cl. ........................... 526/88; 430/137; 526/909; 526/934; 526/319; 526/346
[58] Field of Search ................ 526/88, 909, 934

[56] References Cited

U.S. PATENT DOCUMENTS

| | | | |
|---|---|---|---|
| 4,590,030 | 5/1986 | Gillner et al. | 264/331.19 |
| 4,619,967 | 10/1986 | Emerson et al. | 524/801 |
| 4,849,318 | 7/1989 | Tsubota et al. | 430/137 |
| 5,133,992 | 7/1992 | Nair et al. | 427/213.34 |
| 5,427,885 | 6/1995 | Ota et al. | 430/137 |
| 5,563,189 | 10/1996 | Hosokawa et al. | 523/322 |
| 5,563,226 | 10/1996 | Muehlbauer et al. | 526/173 |

FOREIGN PATENT DOCUMENTS

| | | |
|---|---|---|
| 0 132 169 A1 | 1/1985 | European Pat. Off. . |
| 59-6928 | 1/1984 | Japan . |
| 59-166231 | 9/1984 | Japan . |
| 1-023977 | 1/1989 | Japan . |
| 02032363 | 2/1990 | Japan . |
| 03043402 | 2/1991 | Japan . |
| WO 92/14541 | 9/1992 | WIPO . |

*Primary Examiner*—Jeffrey T. Smith
*Assistant Examiner*—Roberto Rabago

[57] ABSTRACT

The present invention provides a polymerizable monomer composition particle and a resin particle, both of which display a narrow particle diameter distribution. A process for producing a resin particle comprises the steps of: passing two liquids through a static type in-line mixer having a liquid-dividing mechanism standing in a static state, wherein the two liquids are formable into two phases including one of the two liquids as a dispersing phase component and the other as a continuous phase component; then passing the two liquids through a high speed shearing type dispersing machine having a liquid-shearing mechanism which revolves at a high speed, thus dispersing a fine liquid drop of the dispersing phase component into the continuous phase component; and forming a resin particle from the resultant liquid drop.

7 Claims, 6 Drawing Sheets

PRODUCTION PROCESS, PRODUCTION APPARATUS, AND PRODUCT OF RESIN PARTICLE

BACKGROUND OF THE INVENTION

A. Technical Field

The present invention relates to a production process and a production apparatus for a resin particle to provide a fine resin particle in a state where its particle size is uniform, and further, the invention relates to a product of the resin particle.

B. Background Art

In recent years, a resin particle is widely used in various fields. Specific examples of the use of the resin particle are as follows: clearance holding materials (spacers for liquid crystal display elements), slipping agents, functional carriers, toners, and functional fillers that control the fluidity or gloss properties of paints. As to the resin particle as utilized for these uses, its particle diameter needs to be controlled depending on the uses.

An example of methods to easily obtain the resin particle is a suspension polymerization method, in which a dispersing phase component such as a polymerizable monomer composition insoluble in a continuous phase component such as water is dispersed in the form of a liquid drop into the continuous phase component, and the liquid drop is then polymerized, thus obtaining a resin particle.

The conventional suspension polymerization method has a problem in that the particle diameter distribution of the liquid drop as dispersed in the continuous phase component is broad.

For example, the above-mentioned various uses often need a fine resin particle with an average particle diameter of less than 10 $\mu$m. However, there is a problem in that: where the particle diameter is lessened simply by mechanical operation, the distribution of the applied force in the system tends to be non-uniform, and therefore, the formation of fine particles is greatly increased, but particles of which the dispersing is only slowly promoted also remain and large-sized particles are allowed to also be present, so the resultant particle diameter distribution is broad.

Conventionally, there is also a process in which: a resin is dissolved into a solvent, the resultant solution is dispersed into a water base continuous phase, and the solvent is volatilized, thus obtaining a resin particle; or a process in which: a resin as melted by heating is dispersed into a heated water base continuous phase to regulate the particle diameter, and the water base continuous phase is then cooled, thus forming a resin particle. However, it is similarly indicated that there is a problem in that the resultant particle diameter distribution is broad.

SUMMARY OF THE INVENTION

A. Objects of the Invention

An object of the present invention is to provide a particle of a polymerizable monomer composition, which particle displays a narrow particle diameter distribution.

Another object of the present invention is to provide a resin particle having a narrow particle diameter distribution.

B. Disclosure of the Invention

A process for producing a resin particle, according to the present invention, comprises the steps of:

passing two liquids through a static type in-line mixer having a liquid-dividing mechanism standing in a static state, wherein the two liquids are formable into two phases including one of the two liquids as a dispersing phase component and the other as a continuous phase component;

then passing the two liquids through a high speed shearing type dispersing machine having a liquid-shearing mechanism which revolves at a high speed, thus dispersing a fine liquid drop of the dispersing phase component into the continuous phase component; and forming a resin particle from the resultant liquid drop.

An apparatus for producing a resin particle, according to the present invention, comprises:

a static type in-line mixer having a liquid-dividing mechanism standing in a static state; and a high speed shearing type dispersing machine having a liquid-shearing mechanism revolving at a high speed, which is installed behind the static type in-line mixer;

with the apparatus being used for a process including the steps of:

dispersing a fine liquid drop of a dispersing phase component into a continuous phase component, wherein the dispersing phase component is one of two liquids which is formable into two phases, and the continuous phase component is the other; and forming a resin particle from the resultant liquid drop.

The static type in-line mixer may have a structure in which one end of a tube is an inlet, and the other end of the tube is an outlet, and clockwise rotary guide plates and counterclockwise rotary guide plates are arranged in the tube alternately in a direction along a central axis line of the tube, wherein the clockwise rotary guide plates and the counterclockwise rotary guide plates rotate along the central axis line of the tube while dividing a section of the tube into two.

The Weber number of the static type in-line mixer is preferably set to fall within the range of 100 to 5,000.

The liquid drop of the dispersing phase component may have a particle diameter of 10 $\mu$m or less after passed through the static type in-line mixer and before passed through the high speed shearing type dispersing machine.

The high speed shearing type dispersing machine may have a rotor at least, and an arrangement may be made such that the dispersing phase component as fed into the dispersing machine can be dispersed by shearing due to rotation of the rotor.

The apparatus, according to the present invention, may further comprise an agitation type mixer in front of the static type in-line mixer.

Because the static type in-line mixer as used in the present invention does not have a driving mechanism but disperses the dispersing phase component in the form of a liquid drop into the continuous phase component only using the liquid-dividing mechanism standing in a static state, the particle diameter of the resultant liquid drop of the dispersing phase component is relatively uniform. As is mentioned below, as to the particle diameter, a fine liquid drop having a particle diameter of 10 $\mu$m or less can be obtained by adjusting operation conditions such as the Weber number of the static type in-line mixer. In the present invention, therefore, the static type in-line mixer is used as a main means for particle formation. In addition, as to the particle diameter distribution, a foot of the peak of the particle diameter distribution extends long on the larger particle diameter side, although the ratio thereof is small. However, such a large liquid drop (coarse particle) is finely sheared with the high speed shearing type dispersing machine, as auxiliarily used in the later stage, and therefore does not provide an obstacle.

Because the static type in-line mixer has therein no driving part that stirs and disperses a suspended fluid, it is difficult that a large load is given to the liquid drop. Accordingly, a liquid drop having a desired particle diameter can be obtained, and the formation of particles, such as W/O/W type particles, which contain the continuous phase component, can be inhibited. Thus, properties of the resultant liquid drop can be prevented from deterioration.

The high speed shearing type dispersing machine has a liquid-shearing mechanism revolving at a high speed, and can transform the dispersing phase component into a fine liquid drop by strong shearing operation. The liquid-shearing mechanism revolving at a high speed is excellent in fining the liquid drop, but has so strong shearing operation that where an attempt to obtain a liquid drop only using the high speed shearing type dispersing machine is made, a super fine liquid drop tends to form and the particle diameter distribution tends to be broad. In the present invention, however, because the dispersing phase component is first divided with the static type in-line mixer to form liquid drops having a relatively uniform particle diameter, and because coarse particle portions of these liquid drops (corresponding to the above-mentioned foot portion of the peak of the particle diameter distribution mainly extending long on the larger particle diameter side) are fined to one more degree with the high speed shearing type dispersing machine, it is enough for the present invention that the high speed shearing type dispersing machine gives a little shearing operation to the liquid component as fed from the static type in-line mixer. Therefore, the aforementioned super fine liquid drop does not form. Because the liquid drop of the coarse particle is fined by shearing with the high speed shearing type dispersing machine, the resultant average particle diameter of the liquid drop is lessened a little.

That is to say, in the present invention, the liquid drop in the resultant dispersion as discharged from the high speed shearing type dispersing machine has a very fine particle diameter and a narrow particle diameter distribution, and is therefore uniform in particle diameter.

In the present invention, the particle diameter resultant from the static type in-line mixer nearly determines a final stage particle diameter. The particle diameter resultant from the static type in-line mixer can be controlled by fitly setting the Weber number of the static type in-line mixer.

These and other objects and the advantages of the present invention will be more fully apparent from the following detailed disclosure.

DETAILED DESCRIPTION OF THE INVENTION

<Production apparatus>

First, preferable constitution of the main part in an apparatus of the present invention is explained.

Figure 1:
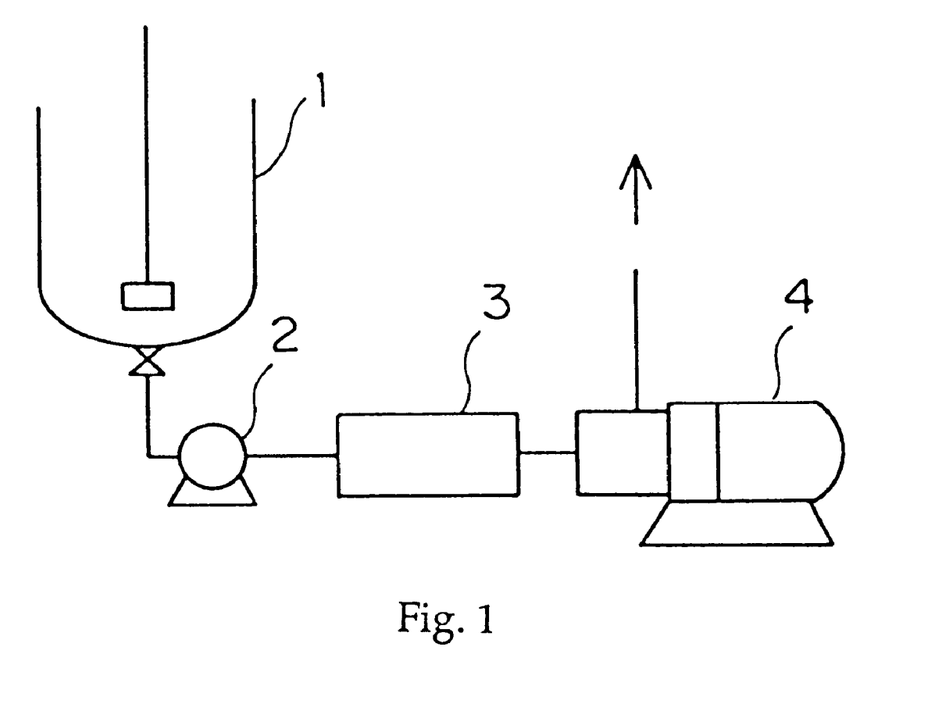
FIG. 1 is a scheme showing an example of the main part of the apparatus according to the present invention.

As is shown in FIG. 1, an agitation mixing vessel 1, a pump 2, a static type in-line mixer 3, and a high speed shearing type dispersing machine 4 are arranged in this order such that a dispersing phase component and a continuous phase component as charged into the agitation mixing vessel 1 can be run in this order by operation of the pump 2. Although not drawn, behind the high speed shearing type dispersing machine 4, the following are further arranged: a suspension polymerization reaction vessel (not drawn) in the case where the dispersing phase component is a monomer composition; a solvent-heating evaporator (not drawn) in the case where the dispersing phase component is a resin solution; and a cooler (not drawn) in the case where the dispersing phase component is a resin-melted matter.

The agitation mixing vessel 1 is a conventional type that agitates and mixes a liquid by rotation of an impeller. The pump 2 is not especially limited if it can supply at a constant flow rate a liquid which runs through the static type in-line mixer 3, and examples of the pump 2 includes spiral pumps, rotary pumps, Mono pumps.

Figure 2:
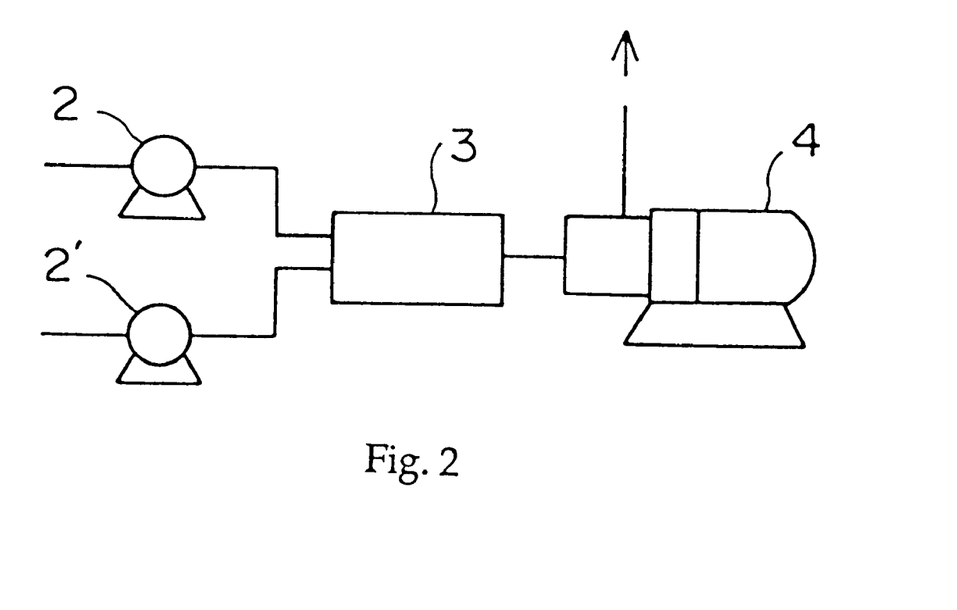
FIG. 2 is a scheme showing another example of the main part of the apparatus according to the present invention.

FIG. 2 shows another example of the main part in the production apparatus. In this example, the agitation mixing vessel 1 is omitted, and the dispersing phase component and the continuous phase component are separately fed into the static type in-line mixer 3 using two pumps 2 and 2'.

Figure 3:
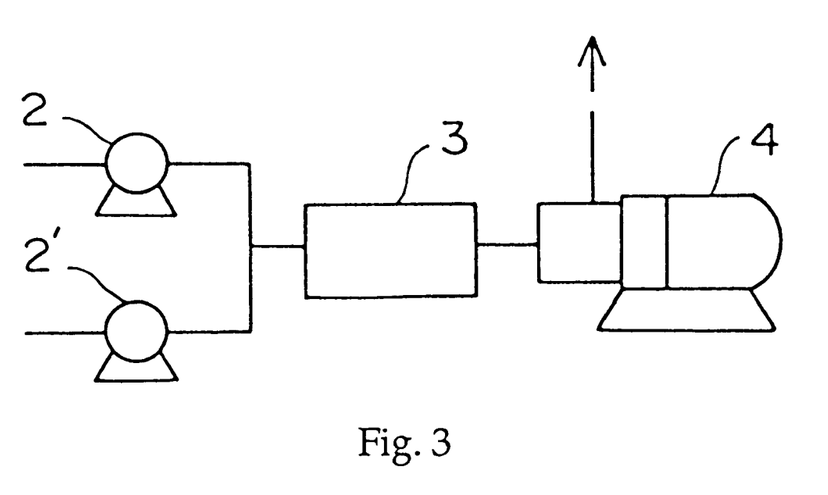
FIG. 3 is a scheme showing further another example of the main part of the apparatus according to the present invention.

FIG. 3 shows further another example of the main part in the production apparatus. In this example, the agitation mixing vessel 1 is also omitted, and the dispersing phase component and the continuous phase component are separately discharged from two pumps 2 and 2' and then fed together into the static type in-line mixer 3.

Like in the example of FIG. 1, it is preferable for more sharpening the particle diameter distribution that the dispersing phase component is beforehand transformed into a liquid drop and then fed into the static type in-line mixer 3. That is to say, if the average particle diameter of the liquid drop is primarily regulated to 30–1,000 $\mu$m with the agitation mixing vessel 1 and then secondarily regulated to 3–40 $\mu$m with the static type in-line mixer 3, a liquid drop having a uniform average particle diameter of 2 to 35 $\mu$m with a sharper particle diameter distribution (the coefficient of the variation is usually 50% or less, preferably, 45% or less) can be obtained.

It is enough for the present invention that the static type in-line mixer 3 is equipped with the liquid-dividing mechanism standing in a static state and has an operation of dividing finely a liquid that runs through the tube. Specific examples of the static type in-line mixer 3 includes Noritake Static Mixer (available from Noritake Co., Ltd.), Sulzer Mixer (available from Sumitomo Heavy Machine Industries, Ltd.), Toray Static Type In-line Mixer (available from Toray Industries, Inc.), Sukeya Mixer (available from Sakura Seisakusho Co., Ltd.), TK-ROSS LPD Mixer (available from Tokushu Kika Kogyo Co., Ltd.).

Figure 4:
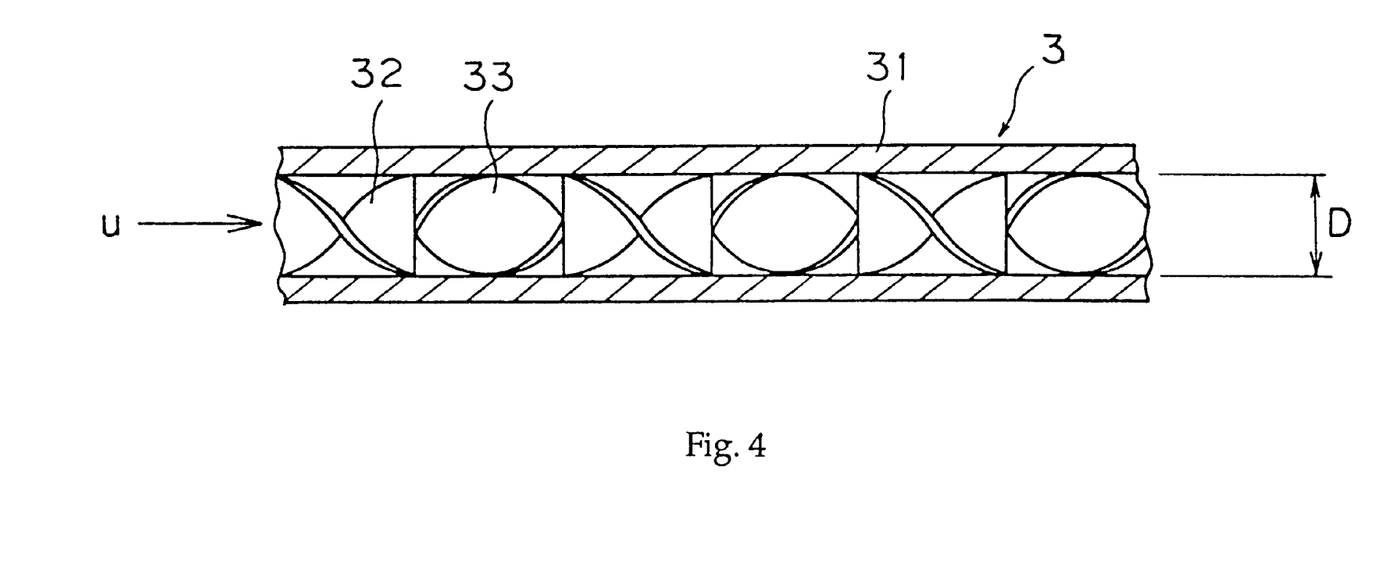
FIG. 4 is a sectional perspective showing an example of an internal structure of the static type in-line mixer.

A preferable example of the structure of the static type in-line mixer 3 is shown in FIG. 4. The static type in-line mixer 3 has a tube 31 and a structure in which one end of the tube 31 is an inlet (not drawn), and the other end of the tube 31 is an outlet (not drawn), and clockwise rotary guide plates 32 and counterclockwise rotary guide plates 33 are arranged in the tube 31 alternately in a direction along a central axis line of the tube 31, wherein the clockwise rotary guide plates 32 and the counterclockwise rotary guide plates 33 rotate along the central axis line of the tube 31 while dividing a section of the tube 31 into two. A dispersing phase component and a continuous phase component, as are fed into the tube 31 from one end thereof at average linear velocity u, are repeatedly divided and rotated while passing through the two types of guide plates 32 and 33 as arranged in sequence, and then discharged from the other end of the tube 31 in a state where the dispersing phase component is a liquid drop.

The Weber number of the static type in-line mixer 3 is preferably set to fall within the range of 100 to 5,000, more preferably, 500 to 3,000. Where the Weber number is less than 100, it is difficult that the liquid running through the tube makes a turbulent flow, and that the dividing operation works. On the other hand, even if the Weber number is more than 5,000, the particle diameter of the resultant liquid drop is not so greatly lessened. The Weber number, We, can be calculated from the below-mentioned equation, where D is an inner diameter of the mixer (cm), u is an average linear velocity of the liquid (cm/sec), ρc is a continuous phase density (g/cm$^3$), and σs is an interfacial tension (dyn/cm).

$$We = (D \cdot u^2 \cdot \rho c)/\sigma s$$

It is enough for the present invention that the high speed shearing type dispersing machine 4 has a liquid-shearing mechanism revolving at a high speed. The high speed shearing type dispersing machine 4 generally comprises a rotor and a stator and has a structure such that shearing operation is caused between the rotor and the stator by high speed rotation of the rotor, thus dispersing finely the dispersing phase component into the continuous phase component. Specific examples of the high speed shearing type dispersing machine 4 include HomogenizerPolytron (available from Central Scientific Trade Co., Ltd.), Capitron (available from Eurotech Co., Ltd.), Homogenizer-Hystron (available from Nichion Medical and Scientific Instruments Co., Ltd.), Biomixer (available from Nippon Seiki Seisakusho Co., Ltd.), Turbo Type Agitator (available from Kodaira Seisakusho Co., Ltd.), Ultra Disper (available from Asada Iron Works Co., Ltd.), Ebara Milder (available from Ebara Co.), TK Homomixer, TK Pipeline Mixer, TK Homomic Line Mill, TK Homojetter, TK Unimixer, TK Homomic Line Flow, TK Highline Mill (these are available from Tokushu Kika Kogyo Co., Ltd.).

Figure 5:
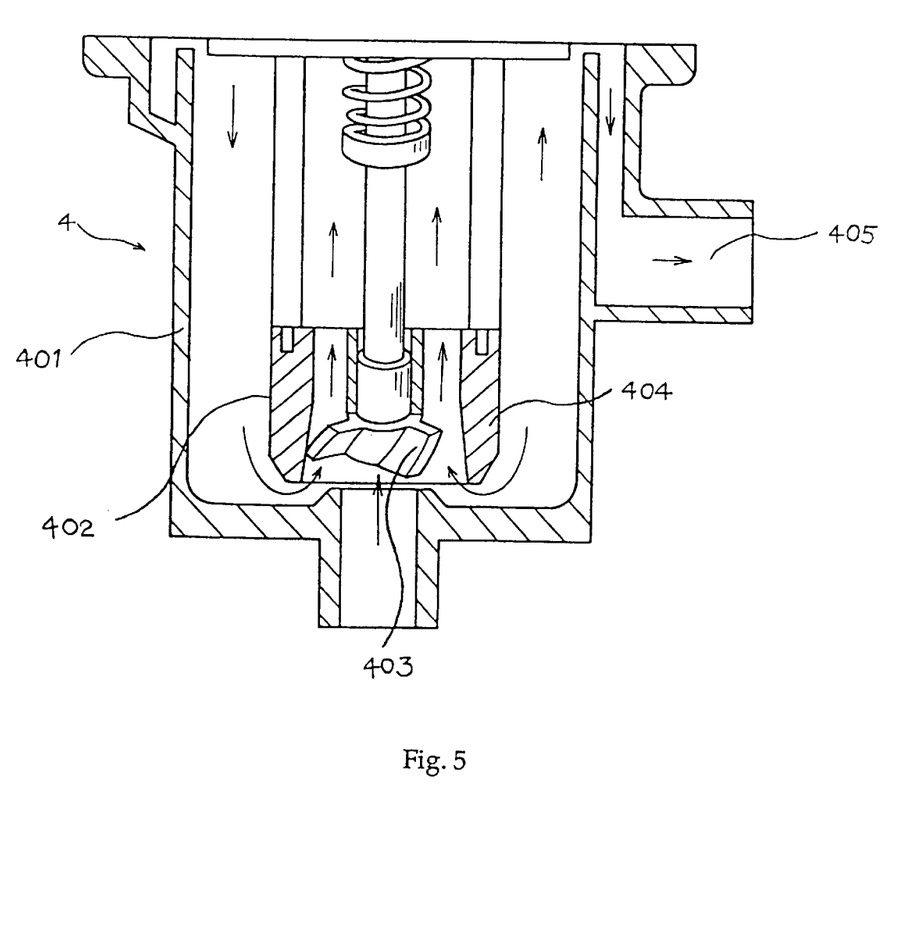
FIG. 5 is a sectional perspective showing an example of an internal structure of the high speed shearing type dispersing machine.

An example of the structure of the high speed shearing type dispersing machine 4 is shown in FIG. 5. A liquid-shearing mechanism 402 is installed in a housing 401 of the dispersing machine 4. The liquid-shearing mechanism 402 comprises a fixed stator 404 and a rotor 403 having screw type teeth, and an arrangement is made such that the rotor 403 can rotate inside the stator 404 at a high speed. A liquid as run into the rotor 403 passes between teeth of the rotor 403, and then runs backward through a clearance between the rotor 403 and the stator 404, and finally runs into an outlet passage 405 while causing macroscopic convective circulation as the whole inside of the housing 401.

Although the rotor with screw type teeth is shown in FIG. 5, the present invention is not limited to this, and a rotor with no teeth may be used. Where the rotor with no teeth is used, grinding down force is generated between the rotor and the stator due to rotation of the rotor, whereby the dispersing phase component is dispersed by shearing and fined. It is preferable for carrying out the shearing dispersion more efficiently that the respective surfaces of the rotor and the stator are coarsened.

As to the rotor with teeth as shown in FIG. 5, while the liquid passes between the teeth, the dispersing phase component is dispersed by shearing due to the rotation of the rotor and subjected to impact force due to cavitation fracture, and thereby fined. Of course, also as to the rotor with teeth, it is preferable for enhancing the efficiency of the shearing dispersion that the rotor has a structure that can generate grinding down force between the rotor and the stator.

The shape of the teeth of the rotor is not limited to the screw type as shown in FIG. 5, but may be like comb teeth that are straight. Generally, where the viscosity of the liquid is high, the screw type may be used, and where the viscosity of the liquid is low, the comb teeth type may be used.

In FIG. 5, the rotational shaft fixing the rotor is shorter than the rotor, but the present invention is not limited to this, and the rotational shaft may be either as long as or longer than the rotor.

Figure 6:
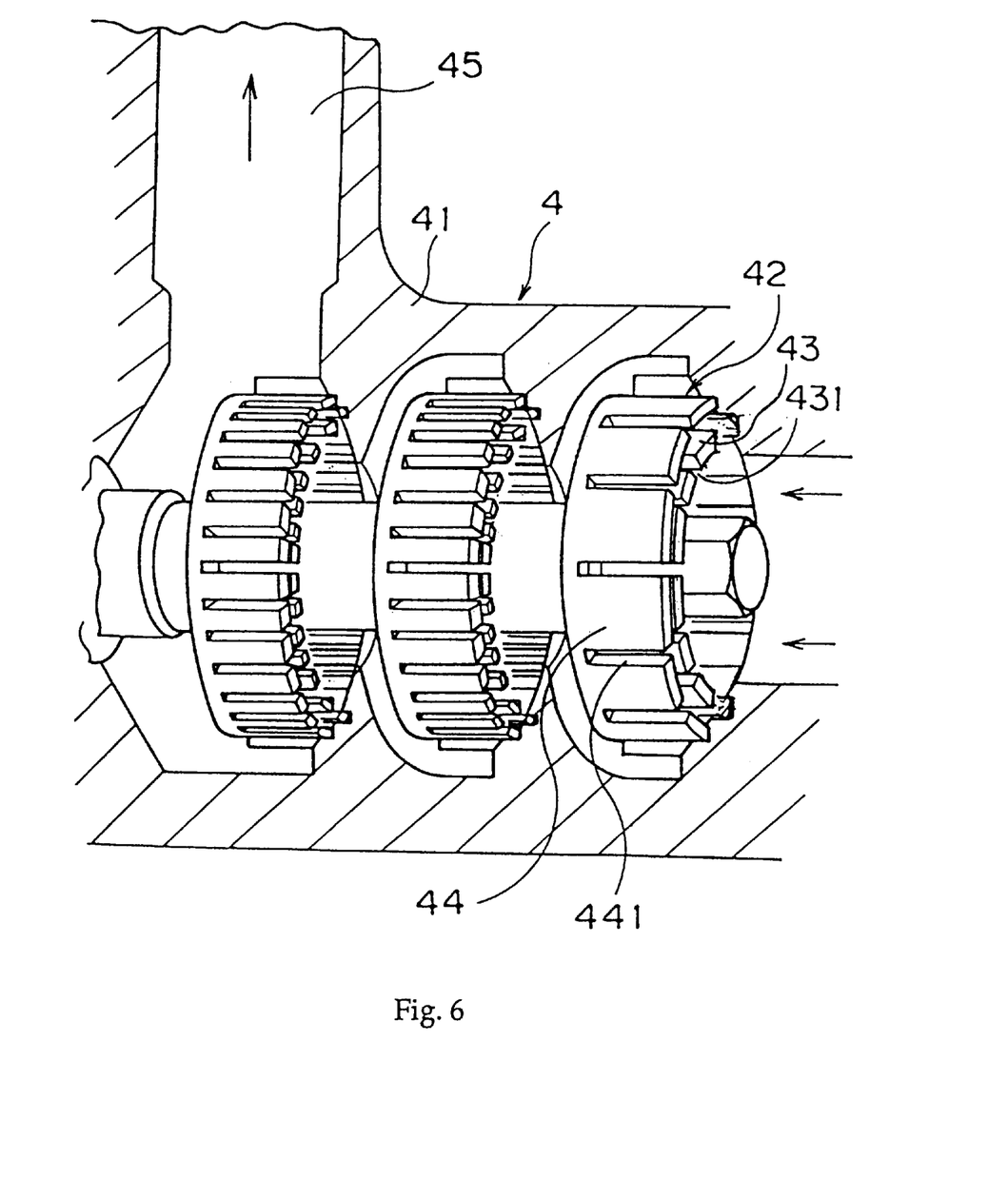
FIG. 6 is a sectional perspective showing another example of an internal structure of the high speed shearing type dispersing machine.

Another example of the structure of the high speed shearing type dispersing machine 4 is shown in FIG. 6. Three sets of liquid-shearing mechanisms 42 are installed in a housing 41 of the dispersing machine 4. Each set of the liquid-shearing mechanisms 42 comprises a basket-shaped rotor 43 with a plurality of slits 431 . . . on its peripheral wall and a basket-shaped stator 44 with a plurality of slits 441 . . . on its peripheral wall. In this example of the figure, the rotor 43 and the stator 44 are arranged concentrically such that the rotor 43 is inserted in the stator 44, but the inside-outside relation between both 43 and 44 may be reversed. A fluid as run into the inside of the rotor 43 passes through respective slits 431, 441 . . . of both 43 and 44 in sequence and then runs into the next liquid-shearing mechanism 42, and finally, runs into a outlet passage 45. Then, while the liquid passes through the slits 441 . . . the dispersing phase component is subjected to impact force due to cavitation fracture and dispersed by shearing due to the rotation of the rotor 43, and thereby fined.

As is aforementioned, the high speed shearing type dispersing machine 4 only fines the coarse particle portion of the liquid drop resultant beforehand from the static type in-line mixer 3, and it is rather unfavorable to apply a large load to the liquid drop. Therefore, referring to the above-mentioned example of FIG. 6, the rotational peripheral velocity of the rotor 43 is preferably in the range of 5 to 30 m/s, more preferably, 10 to 20 m/s. Where the rotational peripheral velocity of the rotor 43 is more than 30 m/s, the particle diameter is not lessened, an operation to combine liquid drops is high, and the particle diameter distribution is broadened. On the other hand, where the rotational peripheral velocity of the rotor 43 is less than 5 m/s, the coarse particle portion of the liquid drop is difficult to sufficiently fine.

As to the apparatus of the present invention, even if the flow rate running therethrough is about three times as fast as a flow rate that is run when using the high speed shearing type dispersing machine 4 alone, the particle diameter distribution of the liquid drop is not broadened, and in addition, the particle diameter may be lessen as the flow rate is increased. The increase of the flow rate enables the period of the steps to be shorten and the apparatus to be small-sized, and is therefore industrially advantageous.

As to the reaction vessel (not drawn), conventional ones are used. In the reaction vessel, the liquid drop is polymerized to obtain a resin particle. In addition, operations, for example, to remove the solvent from the resin particle by heating, are made and the resin particle is finally cooled.

<Production Process>

Hereinafter, an explanation is made about preferred embodiments of the production process for a resin particle in which the aforementioned production apparatus is used, exemplifying a case where a monomer composition is used as the dispersing phase component to carry out suspension polymerization.

(First Step)

This step is carried out in the agitation vessel 1, where the dispersing phase component is primarily regulated in order to obtain a first particle with a weight-average particle diameter of 30 to 1,000 μm, preferably, 30 to 600 μm, of a polymerizable monomer composition comprising the dispersing phase component, thus transforming the dispersing phase component into a liquid drop beforehand.

The dispersing phase component comprises components such as a polymerizable monomer and a crosslinkable monomer that is copolymerizable with the polymerizable monomer.

The polymerizable monomer is not especially limited if it is such as used in conventional suspension polymerization methods, and examples thereof include: styrene monomers such as styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, and p-chlorostyrene; (meth)acrylic monomers such as methyl acrylate, ethyl acrylate, n-butyl acrylate, isobutyl acrylate, dodecyl acrylate, stearyl acrylate, 2-ethylhexyl acrylate, tetrahydrofurfuryl acrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, and stearyl methacrylate; olefinic resins such as ethylene, propylene, and butylene; other monomers such as acrylic acid, methacrylic acid, vinyl chloride, vinyl acetate, acrylonitrile, acrylamide, methacrylamide, and N-vinylpyrrolidone. These may be used in combinations of two or more thereof.

Where it is desired to obtain a resin particle with a intermolecular crosslinked structure, a crosslinking agent with two or more polymerizable double bond groups in the molecule may be copolymerized with the above-mentioned polymerizable monomer.

Examples of the crosslinking agent include aromatic vinyl compounds such as divinylbenzene, divinylnaphthalene, and derivatives thereof; crosslinkable (meth)acrylic compounds such as trimethylolpropane triacrylate, ethylene glycol dimethacrylate, diethylene glycol dimethacrylate, triethylene glycol dimethacrylate, decaethylene glycol dimethacrylate, pentadecaethylene glycol dimethacrylate, 1,3-butylene dimethacrylate, allyl methacrylate, trimethylolpropane trimethacrylate, pentaerythritol tetramethacrylate, and diethylene glycol dimethacrylate phthalate; compounds with two vinyl groups such as N,N-divinylaniline, divinyl ether, divinyl sulfide, and divinylsulfonic acid; and compounds with three or more vinyl groups. These may be used in combinations of two or more thereof. Furthermore, polybutadiene, polyisoprene, unsaturated polyester, chlorosulfonated polyolefin may be used.

The dispersing phase component may further comprise other materials such as resins, colorants, and magnetic powders within the usable range.

Examples of the above-mentioned resin include styrene resins, (meth)acrylic resins, polyester resins, polyethylene resins, polypropylene resins, polybutylene resins, epoxy resins, vinyl chloride resins, vinyl acetate resins, polyamide resins, polyimide resins, cumaron resins, aromatic petroleum resins, and aliphatic petroleum resins. These may be used in combinations of two or more thereof.

The above-mentioned colorants may be either organic or inorganic pigments, or may be mixtures thereof.

Examples of the inorganic pigment include powders or particles such as carbon black, alumina, titanium dioxide, barium titanate, magnesium titanate, calcium titanate, strontium titanate, zinc oxide, silica sand, clay, mica, wollastonite, diatomite, various types inorganic oxide pigments (e.g. chromium oxide, cerium oxide, red iron oxide, antimony trioxide, magnesium oxide, zirconium oxide), barium sulfate, barium carbonate, calcium carbonate, silica fine powder, silicon carbide, silicon nitride, boron carbide, tungsten carbide, titanium carbide. These may be used in combinations of two or more thereof. These inorganic pigments may be such as treated with conventional hydrophobicizing agents such as titanium coupling agents, silane coupling agents, and metal salts of higher fatty acids.

Examples of the organic pigment include: yellow pigments such as naples yellow, naphthol yellow S, Hansa yellow G, Hansa yellow 10G, benzidine yellow G, benzidine yellow GR, quinoline yellow lake, permanent yellow NCG, and Tatrazine Lake; orange pigments such as molybdem orange, permanent orange RK, benzidine orange G, and indanthrene brilliant orange GK; red pigments such as permanent red 4R, lithol red, pyrazolone red 4R, watchung red calcium salt, lake red D, brilliant Carmine 6B, eosine lake, rhodamine lake B, alizarin lake, and brilliant Carmine B; violet pigments such as fast violet and methyl violet lake; blue pigments such as alkali blue lake, Victoria blue lake, phthalocyanine blue, metal-free phthalocyanine blue, partial chloride of phthalocyanine blue, fast sky blue, and indanthrene blue BC; green pigments such as Malachite green lake, and fanal yellow green G. These may be used in combinations of two or more thereof.

Examples of the above-mentioned magnetic powder include: powders of ferromagnetic metals such as iron, cobalt, and nickel; powders of metal oxides such as magnetic powder, hematite, and ferrite. These may be used in combinations of two or more thereof.

Next, the aforementioned continuous phase component is not especially limited if it is formable into two phases along with the dispersing phase component and usable in conventional suspension polymerization methods. Preferable examples thereof include water base solvents such as water and mixtures of water and alcohols.

The continuous phase component may further comprise dispersion stabilizers to stabilize suspended particles in suspension polymerization.

Examples of the dispersion stabilizer include: water-soluble high molecules such as polyvinyl alcohol, gelatin, tragacanth, starch, methylcellulose, carboxymethylcellulose, hydroxyethylcellulose, sodium polyacrylate, and sodium polymethacrylate; surfactants such as sodium dodecylbenzenesulfonate, sodium tetradecylsulfate, sodium pentadecylsulfate, sodium octylsulfate, sodium allyl-alkyl-polyethersulfonate, sodium oleate, sodium laurate, sodium caproate, sodium stearate, sodium 3,3'-disulfonediphenylurea-4,4'-diazo-bis-amino-8-naphthol-6-sulfonate, o-carboxybenzene-azo-dimethylaniline, sodium 2,2',5,5'-tetramethyl-triphenylmethane-1,1'-dimethyl-azo-bis-β-naphthol-disulfonate, sodium alkylnaphthalenesulfonate, sodium dialkylsulfosuccinate, sodium alkyl diphenyl ether disulfonate, sodium polyoxyethylene alkylsulfate, triethanolamine polyoxyethylene alkyl ether sulfate, ammonium polyoxyethylene phenyl ether sulfate, sodium alkali sulfonate, sodium salt of β-naphthalenesulfonic acid-formalin condensation product, sodium salt of specific aromatic sulfonic acid-formalin condensation product, polyoxyethylene lauryl ether, polyoxyethylene cetyl ether, polyoxyethylene stearyl ether, polyoxyethylene octyl phenyl ether, polyoxyethylene nonyl phenyl ether, polyoxyethylene sorbitan alkylate, lauryltrimethylammonium chloride, stearyltrimethylammonium chloride, cetyltrimethylammonium chloride, distearyldimethylammonium chloride, and alkylbenzyldimethylammonium chloride; alginic salts, zein, casein, barium sulfate, calcium sulfate, barium carbonate, magnesium carbonate, calcium phosphate, talc, clay, diatomite, bentonite, titanium hydroxide, thorium hydroxide, metal oxide powders. These may be used in combinations of two or more thereof.

(Second Step)

This step is carried out in the static type in-line mixer 3, where the first particle as obtained in the first step is secondarily regulated in order to obtain a second particle with a weight-average particle diameter of 3 to 40 $\mu$m, preferably, 3 to 20 $\mu$m, of the polymerizable monomer composition.

In this step, the Weber number of the static type in-line mixer is preferably in the range of 100 to 5,000, more preferably, 500 to 3,000. Where the Weber number deviates from these ranges, the resultant liquid drop cannot be controlled to a desired particle diameter. In addition, where the Weber number is less than 100, the passing velocity of the suspended fluid is so slow that the agitation mixing power in the tube may be weak and that it may be impossible to carry out a sufficient regulation to the particle. Even if the Weber number is increased to more than 5,000, the resultant liquid drop is not lessened any more, so this is insufficient.

(Third Step)

This step is carried out in the high speed dispersing machine 4, where the second particle as obtained in the second step is tertiarily regulated in order to obtain a third particle with a weight-average particle diameter of 2 to 15 $\mu$m, preferably, 3 to 10 $\mu$m, more preferably, 4 to 8 $\mu$m, of the polymerizable monomer composition.

(Reaction Step)

This step is carried out in the suspension polymerization reaction vessel. This step is a step to carry out suspension polymerization of the third particle, resultant from the third step, to obtain a fine resin particle.

As to polymerization initiators as used in the polymerization, peroxide initiators or azo initiators, which are oil-soluble and conventionally used in suspension polymerization, can be utilized. Specific examples thereof include: peroxide initiators such as benzoyl peroxide, lauroyl peroxide, octanoyl peroxide, o-chlorobenzoyl peroxide, o-methoxybenzoyl peroxide, methyl ethyl ketone peroxide, diisopropylperoxy dicarbonate, cumene hydroperoxide, t-butyl hydroperoxide, and diisopropylbenzene hydroperoxide; azo initiators such as 2,2'-azobisisobutyronitrile, 2,2'-azobis(2,4-dimethylvaleronitrile), 2,2'-azobis(2,3-dimethylbutyronitrile), 2,2'-azobis(2-methylbutyronitrile), 2,2'-azobis(2,2,3-trimethylbutyronitrile), 2,2'-azobis(2-isopropylbutyronitrile), 1,1'-azobis(cyclohexane-1-carbonitrile), 2,2'azobis(4-methoxy-2,4-dimethylvaleronitrile), 2-(carbamoylazo)isobutyronitrile, 4,4-azobis(4-cyanovaleric acid), and dimethyl-2,2'-azobisisobutylate.

The method for adding the polymerization initiator is not especially limited, but in a preferable one, the polymerization initiator is dissolved into the polymerizable monomer. The amount of the polymerization initiator as used is preferably in the range of 0.1 to 20 wt %, more preferably, 1 to 10 wt %, of the dispersing phase component.

The production process for a resin particle is explained above, exemplifying the case where the suspension polymerization is carried out using the aforementioned production apparatus. However, the production process for a resin particle may be a in-liquid particle formation process in which various resins are dispersed into continuous phase components that do not dissolve the resins, thus obtaining resin particles.

In the in-liquid particle formation process, various resins are dissolved into solvents or melted by heating to liquefy the resins, and then dispersed into continuous phase components, for example, with the apparatus as shown in FIG. 2 or 3, thus obtaining suspensions. Where the resins are dissolved into solvents, resin particles are obtained by heating the suspensions to remove the solvents from liquid drops of the resins. In addition, where the resins are melted by heating, resin particles are obtained by cooling the suspensions to reduce the temperature of the suspensions.

The above-mentioned resins are not especially limited if they are substances that can be liquefied by dissolution into solvents or by melting due to heating. Examples thereof include styrene resins, (meth)acrylic resins, polyester resins, polyethylene resins, polypropylene resins, polybutylene resins, epoxy resins, vinyl chloride resins, vinyl acetate resins, polyamide resins, polyimide resins. These resins may be used alone or in combinations of two or more thereof.

The resin particle as obtained in the present invention can be applied to wide uses such as toners for electrostatic latent image development; additives for paints, additives for ink, additives for paper, matting agents, flatting agents, light diffusing agents, thermographic ink ribbon coating agents, thermographic ink, back coating agents for magnetic recording media, powder paints, spacer materials, and colorants.

(Effects and Advantages of the Invention):

The production process and the production apparatus for a resin particle, according to the present invention, can easily provide a liquid drop having a small particle diameter in a state of a narrow particle diameter distribution.

In the present invention, if the Weber number of the static type in-line mixer is controlled so as to fall within the range of 100 to 5,000, a liquid falls into a state of a favorable turbulent flow, and a drop of the liquid can easily be controlled to a desired particle diameter.

DETAILED DESCRIPTION OF THE PREFERRED EMBODIMENTS

Hereinafter, the present invention is more specifically illustrated by the following examples of some preferred embodiments in comparison with comparative examples not according to the invention. However, the present invention is not limited to the below-mentioned examples. In addition, in the below-mentioned examples and comparative examples, the units "part(s)" and "%" denote "part(s) by weight" and "% by weight" respectively.

EXAMPLE 1

A continuous phase component comprising 4,000 parts of a 0.2% aqueous solution of Hitenol N08 (ammonium polyoxyethylene alkyl ether sulfate, made by Dai-ichi Kogyo Seiyaku Co., Ltd.), as prepared beforehand, was charged into the agitation mixing vessel 1 as shown in FIG. 1. Furthermore, a dispersing phase component comprising a polymerizable monomer composition, as prepared by dissolving ABNR (2,2'-azobisbutyronitrile, made by Nippon Hydrazine Industries Co., Ltd.) into a mixture of 850 parts of styrene, 100 parts of n-butyl acrylate, and 50 parts of divinylbenzene, was charged into the agitation mixing vessel 1. The resultant mixture was agitated with a paddle wing as equipped to the agitation mixing vessel 1, thus obtaining a mixed dispersion as primarily regulated with regard to particle diameter.

It was verified with an optical microscope that the particle diameter of the dispersing phase component in the resultant mixed dispersion had a very broad distribution of about 50 to about 300 µm.

The mixed dispersion was fed via the liquid-feeding pump 2, as shown in FIG. 1, to Static Mixer (made by Noritake Co., Ltd.), which was a static type in-line mixer 3, and to Ebara Milder (made by Ebara Co.), which was a high speed shearing type dispersing machine 4, in sequence, thus passing the mixed dispersion through the Static Mixer and the Ebara Milder only once, respectively, to obtain a suspension, when operational conditions were as follows: the flow rate was 430 kg/Hr, the Weber number of the Static Mixer was 900, and the revolution number of the Ebara Milder was 10,000 rpm (11 m/s as the rotational peripheral velocity of the rotor). The entirety of the resultant suspension was agitated so uniformly that the resultant polymer particle might not precipitate, thus carrying out polymerization at 75° C. under a nitrogen atmosphere for 6 hours.

After the polymerization, the particle diameter of the resultant resin particle (1) in the suspension was measured with Coulter Multisizer II (made by Coulter Electronic, Inc.). As a result, resin particle (1) was a resin particle that was fine and had a uniform particle diameter in which the volume-average particle diameter was 4.9 µm and the variation coefficient was 35%.

EXAMPLE 2

The suspension and the polymerization were carried out with the same apparatus and under the same conditions as of Example 1 except that the polymerizable monomer composition was replaced with a polymerizable monomer composition, in which carbon black was dispersed uniformly, as obtained by subjecting 850 parts of styrene, 150 parts of n-butyl acrylate, 3 parts of divinylbenzene, 80 parts of carbon black (MA-100R, made by Mitsubishi Chemicals Co.), 4 parts of oleic acid arlinooleate, 10 parts of an electric charge controlling agent (Spiron Black TRH, made by Hodogaya Chemicals Co., Ltd.), 20 parts of ABNR (2,2'-azobisbutyronitrile, made by Nippon Hydrazine Industries Co., Ltd.), and 40 parts of ABNV (2,2'-azobis(2,4-dimethylveleronitrile), made by Nippon Hydrazine Industries Co., Ltd.) to dispersion treatment with a batch type sand mill for 30 minutes.

As a result of verification in the same way as of Example 1, the particle diameter of a mixed dispersion, as primarily regulated with regard to particle diameter, was in the range of about 100 to about 500 µm, and the resultant resin particle (2) in the polymerization liquid was a resin particle that was fine and had a uniform particle diameter, namely, a narrow particle diameter distribution, in which the volume-average particle diameter was 6.1 µm and the variation coefficient was 38%.

A black powder of resin particle (2) was obtained from the polymerization liquid via the steps of filtration, washing, and drying. A developing agent was prepared by sufficiently mixing the resultant black powder as an electrophotographic toner with a silicone resin-coated ferrite carrier such that the toner concentration could be 4%.

The resultant developing agent was set to a copying machine, Leodry 7610, made by Toshiba Co., Ltd., and a copying test was carried out. As a result, a good image with distinct resolution was obtained. In addition, no fog was seen.

EXAMPLE 3

A continuous phase component comprising water containing sodium dodecylbenzenesulfonate of 0.04% and calcium phosphate of 4%, as prepared beforehand, was supplied to an apparatus of FIG. 2, in which the static type in-line mixer 3 was the aforementioned Static Mixer and the high speed shearing type dispersing machine 4 was the aforementioned Ebara Milder, from the supplying pump 2, and a dispersing phase component comprising the same polymerizable monomer composition as of Example 2 was supplied to the apparatus of FIG. 2 from the supplying pump 2', which was a route other than the supplying pump 2, thus obtaining a suspension.

In the above-mentioned operation, conditions were as follows: the flow rate of the continuous phase component was 460 kg/Hr, the flow rate of the dispersing phase component was 110 kg/Hr, the Weber number of the Static Mixer was 1,600, and the revolution number of the Ebara Milder was 10,000 rpm (11 m/s as the rotational peripheral velocity of the rotor).

The resultant suspension was polymerized in the same way as of Example 1. The particle diameter of the resultant resin particle (3) was measured in the same way as of Example 1. As a result, resin particle (3) was fine and good because it had a uniform particle diameter, namely, a narrow particle diameter distribution, in which the volume-average particle diameter was 7.3 µm and the variation coefficient was 30%.

A black powder of resin particle (3) was obtained from the polymerization liquid by dissolving the calcium phosphate with an acid and then carrying out the steps of filtration, washing, and drying.

A copying test was carried out using the resultant black powder as the electrophotographic toner in the same way as of Example 2. As a result, a good image with distinct resolution was obtained. In addition, no fog was seen.

EXAMPLE 4

A suspension was obtained with the same apparatus and under the same conditions as of Example 3 except that the continuous phase component was replaced with a 1.25% aqueous solution of polyvinyl alcohol (PVA 205, made by Kuraray Co., Ltd.), and that the dispersing phase component was replaced with a resin solution as prepared by dissolving 500 parts of a styrene-acrylic resin (styrene/butyl methacrylate, Mw: 150,000) into 500 parts of a mixture of toluene and methanol (toluene/methanol=70/30).

The resultant suspension was maintained for 6 hours while heated at 80° C., thus removing the solvent from the resin. The particle diameter of the resultant resin particle (4) was measured in the same way as of Example 1. As a result, resin particle (4) was fine and good because it had a uniform particle diameter, namely, a narrow particle diameter distribution, in which the volume-average particle diameter was 6.8 µm and the variation coefficient was 41%.

EXAMPLE 5

A solution, as prepared by dissolving 1 part of polyvinyl alcohol into 2,000 parts of deionized water, was charged into a reaction vessel as equipped with a stirrer, an inert gas introducing tube, a reflux condenser, and a thermometer. Furthermore, a mixture, as prepared by dissolving 80 parts of benzoyl peroxide into polymerizable co-monomers comprising 585 parts of styrene, 390 parts of n-butyl methacrylate, and 25 parts of glycidyl methacrylate, was charged into the reaction vessel, and the contents of the reaction vessel were stirred at a high speed to obtain a uniform suspension. Next, while introducing a nitrogen gas into the suspension, the suspension was heated to 80° C., and the stirring was continued at this temperature for 5 hours to carry out a polymerization reaction. Then, water was removed, thus obtaining a polymer with an epoxy group as a reactive group.

Next, 400 parts of the resultant polymer, 150 parts of carbon black (MA-100R, made by Mitsubishi Chemicals Co.), and 30 parts of an electric charge controlling agent (Spiron Black TRH, made by Hodogaya Chemicals Co., Ltd.) were reacted upon each other by mixing and kneading them under conditions of 160° C. and 100 rpm with a pressure kneader, and then cooled and then pulverized, thus obtaining a carbon black graft polymer as a colorant.

The suspension and the polymerization were carried out in the same way as of Example 1 except that the polymerizable monomer composition was replaced with a mixture of 350 parts of the resultant carbon black graft polymer, 850 parts of styrene, 150 parts of n-butyl acrylate, 3 parts of divinylbenzene, 20 parts of ABNR (2,2'-azobisbutyronitrile, made by Nippon Hydrazine Industries Co., Ltd.), and 20 parts of ABNV (2,2'-azobis(2,4-dimethylveleronitrile), made by Nippon Hydrazine Industries Co., Ltd.), and that the high speed shearing type dispersing machine 4 was replaced with TK Homomic Line Flow (made by Tokushu Kika Kogyo Co., Ltd.), and that the flow rate, the Weber number of the Static Mixer, and the revolution number of the TK Homomic Line Flow were 570 kg/Hr, 1,600, and 8,000 rpm (12 m/s as the rotational peripheral velocity of the rotor), respectively.

As a result of verification in the same way as of Example 1, the particle diameter of a mixed dispersion, as primarily regulated with regard to particle diameter, was in the range of about 100 to about 500 $\mu$m, and the resultant resin particle (5) in the polymerization liquid was a resin particle that was fine and had a uniform particle diameter, namely, a narrow particle diameter distribution, in which the volume-average particle diameter was 6.6 $\mu$m and the variation coefficient was 36%.

A black powder of resin particle (5) was obtained from the polymerization liquid via the steps of filtration, washing, and drying.

A copying test was carried out using the resultant black powder as the electrophotographic toner in the same way as of Example 2. As a result, a good image with distinct resolution was obtained. In addition, no fog was seen.

COMPARATIVE EXAMPLE 1

A suspension was obtained in the same way as of Example 2 except that the constitution of the apparatus of FIG. 1 was changed to such that the pump 2 and the static type in-line mixer 3 were eliminated, and that the Ebara Milder as the high speed shearing type dispersing machine 4 was connected to the agitation mixing vessel 1, and that the continuous phase component and the dispersing phase component were subjected to mixing-dispersing treatment (primary particle regulation) with the agitation mixing vessel 1 and then passed through the Ebara Milder only once.

In the above-mentioned operation, conditions were as follows: the flow rate was 200 kg/Hr, and the revolution number of the Ebara Milder was 10,000 rpm (11 m/s as the rotational peripheral velocity of the rotor).

The resultant suspension was polymerized in the same way as of Example 2. The particle diameter of the resultant comparative resin particle (1) was measured in the same way as of Example 1. As a result, comparative resin particle (1) had a volume-average particle diameter of 7.8 $\mu$m and a variation coefficient of 53% and therefore was somewhat large in particle diameter and somewhat broad in particle diameter distribution including a large amount of fine particle.

A black powder of comparative resin particle (1) was obtained from the polymerization liquid via the steps of filtration, washing, and drying.

A copying test was carried out using the resultant black powder as the electrophotographic toner in the same way as of Example 2. As a result, an image with relatively good resolution was obtained, but an edge portion thereof was indistinct, and in addition, fogs were seen.

COMPARATIVE EXAMPLE 2

A suspension was obtained in the same way as of Example 2 except that the constitution of the apparatus of FIG. 1 was changed to such that the static type in-line mixer 3 was eliminated, and that the agitation mixing vessel 1, the pump 2, and the Ebara Milder as the high speed shearing type dispersing machine 4 were connected to each other in sequence, and that the continuous phase component and the dispersing phase component were subjected to mixing-dispersing treatment (primary particle regulation) with the agitation mixing vessel 1 and then passed through the Ebara Milder only once.

In the above-mentioned operation, conditions were the same as those in Example 2: the flow rate was 430 kg/Hr, and the revolution number of the Ebara Milder was 10,000 rpm (11 m/s as the rotational peripheral velocity of the rotor).

The resultant suspension was polymerized in the same way as of Example 1. The particle diameter of the resultant comparative resin particle (2) was measured in the same way as of Example 1. As a result, comparative resin particle (2) had a volume-average particle diameter of 7.5 $\mu$m and a variation coefficient of 60% and therefore was somewhat large in particle diameter and broad in particle diameter distribution including a large amount of fine particle.

A black powder of comparative resin particle (2) was obtained from the polymerization liquid via the steps of filtration, washing, and drying.

A copying test was carried out using the resultant black powder as the electrophotographic toner in the same way as of Example 2. As a result, a good image with distinct resolution was not obtained. In addition, fogs were seen.

COMPARATIVE EXAMPLE 3

A suspension was obtained in the same way as of Example 2 except that the constitution of the apparatus of FIG. 1 was changed to such that the high speed shearing type dispersing machine 4 was eliminated, and that the agitation mixing vessel 1, the pump 2, and the Static Mixer as the static type in-line mixer 3 were connected to each other in sequence, and that the continuous phase component and the dispersing phase component were subjected to mixing-dispersing treatment (primary particle regulation) with the agitation mixing vessel 1 and then passed from the supplying pump 2 through the Static Mixer once.

In the above-mentioned operation, conditions were as follows: the flow rate was 850 kg/Hr, and the Weber number of the Static Mixer was 3,600.

The resultant suspension was polymerized in the same way as of Example 2. The particle diameter of the resultant comparative resin particle (3) was measured in the same way as of Example 1. As a result, comparative resin particle (3) had a volume-average particle diameter of 7.2 µm and a variation coefficient of 67% and therefore was broad in particle diameter distribution including coarse particles.

A black powder of comparative resin particle (3) was obtained from the polymerization liquid via the steps of filtration, washing, and drying.

A copying test was carried out using the resultant black powder as the electrophotographic toner in the same way as of Example 2. As a result, an image with low resolution was only obtained, and the color depth of a black solid portion thereof was non-uniform.

COMPARATIVE EXAMPLE 4

A suspension was obtained in the same way as of Example 4 except that the constitution of the apparatus of FIG. 2 was changed to such that the static type in-line mixer 3 was eliminated, and that the continuous phase component and the dispersing phase component were separately supplied from the pumps 2 and 2' through respective routes to the Ebara Milder which was a high speed shearing type dispersing machine 4. The flow rate and the revolution number were the same as those in Example 4.

The resultant suspension was maintained for 6 hours while heated at 80° C., thus removing the solvent from the resin. The particle diameter of the resultant comparative resin particle (4) was measured in the same way as of Example 1. As a result, comparative resin particle (4) had a volume-average particle diameter of 6.8 µm and a variation coefficient of 58% and therefore was fine, but broad in particle diameter distribution cluding a large amount of fine particle.

COMPARATIVE EXAMPLE 5

A suspension was obtained in the same way as of Example 5 except that the constitution of the apparatus of FIG. 1 was changed to such that the pump 2 and the static type in-line mixer 3 were eliminated, and that the TK Homomic Line Flow as the high speed shearing type dispersing machine 4 was connected to the agitation mixing vessel 1, and that the continuous phase component and the dispersing phase component which were both the same as those in Example 5 were subjected to mixing-dispersing treatment (primary particle regulation) with the agitation mixing vessel 1 and then passed through the TK Homomic Line Flow once in the same way as of Example 1.

In the above-mentioned operation, conditions were as follows: the flow rate was 570 kg/Hr, and the revolution number of the TK Homomic Line Flow was 8,000 rpm (12 m/s as the rotational peripheral velocity of the rotor).

The resultant suspension was polymerized in the same way as of Example 1. The particle diameter of the resultant comparative resin particle (5) was measured in the same way as of Example 1. As a result, comparative resin particle (5) had a volume-average particle diameter of 10.5 µm and a variation coefficient of 53% and therefore was large in particle diameter and somewhat broad in particle diameter distribution including a fine particle.

A black powder of comparative resin particle (5) was obtained from the polymerization liquid via the steps of filtration, washing, and drying.

A copying test was carried out using the resultant black powder as the electrophotographic toner in the same way as of Example 2. As a result, an indistinct image with inferior resolution was only obtained, and a few fogs were seen.

COMPARATIVE EXAMPLE 6

A suspension was obtained in the same way as of Example 5 except that the constitution of the apparatus of FIG. 1 was changed to such that the high speed shearing type dispersing machine 4 was eliminated, and that the agitation mixing vessel 1, the pump 2, and the Static Mixer as the static type in-line mixer 3 were connected to each other in sequence, and that the continuous phase component and the dispersing phase component which were both the same as those in Example 5 were subjected to mixing-dispersing treatment (primary particle regulation) with the agitation mixing vessel 1 and then passed from the supplying pump 2 through the Static Mixer once in the same way as of Example 1.

In the above-mentioned operation, conditions were as follows: the flow rate was 570 kg/Hr, and the Weber number of the Static Mixer was 1,600.

The resultant suspension was polymerized in the same way as of Example 1. The particle diameter of the resultant comparative resin particle (6) was measured in the same way as of Example 1. As a result, comparative resin particle (6) had a volume-average particle diameter of 7.1 µm and a variation coefficient of 65% and therefore was somewhat large in particle diameter and broad in particle diameter distribution including coarse particles.

A black powder of comparative resin particle (6) was obtained from the polymerization liquid via the same steps as of Example 5.

A copying test was carried out using the resultant black powder as the electrophotographic toner in the same way as of Example 2. As a result, an image with relatively good resolution was obtained, but it was somewhat inferior in thin line reproductivity. In addition, almost no fog was seen.

Various details of the invention may be changed without departing from its spirit or its scope. Furthermore, the foregoing description of the preferred embodiments according to the present invention is provided for the purpose of illustration only, and not for the purpose of limiting the invention as defined by the appended claims and their equivalents.

What is claimed is:

1. A process for producing a resin particle, comprising the steps of:

passing two liquids through a static in-line mixer having a liquid-dividing mechanism standing in a static state, wherein the two liquids are formable into two phases including one of the two liquids as a dispersing phase component and the other as a continuous phase component;

then passing the two liquids through a high speed shearing dispersing machine having a liquid-shearing mechanism which revolves at a high speed, thus dispersing a liquid drop of the dispersing phase component into the continuous phase component; and forming a resin particle from the resultant liquid drop.

2. A process according to claim 1, wherein the Weber number of the static in-line mixer is set to fall within the range of 100 to 5,000.

3. A process according to claim 1, which further comprises the steps of:

mixing the two liquids together by agitation to form the dispersing phase component into a liquid drop; and feeding the resultant mixture to the static in-line mixer.

4. A process according to claim 1, wherein the liquid drop of the dispersing phase component has a particle diameter of 10 µm or less after passed through the static in-line mixer and before passed through the high speed shearing dispersing machine.

5. A process according to claim 2, which further comprises the steps of:

mixing the two liquids together by agitation to form the dispersing phase component into a liquid drop; and feeding the resultant mixture to the static in-line mixer.

6. A process according to claim 2, wherein the liquid drop of the dispersing phase component has a particle diameter of 10 µm or less after passed through the static in-line mixer and before passed through the high speed shearing dispersing machine.

7. A process according to claim 3, wherein the liquid drop of the dispersing phase component has a particle diameter of 10 µm or less after passed through the static in-line mixer and before passed through the high speed shearing dispersing machine.

* * * * *